United States Patent
FitzSimons

(10) Patent No.: US 6,719,250 B2
(45) Date of Patent: Apr. 13, 2004

(54) BACKPACKER'S COOKING STAND

(76) Inventor: S. Dunkin FitzSimons, 2120 N. South Trail, Marietta, GA (US) 30066

( * ) Notice: Subject to any disclaimer, the term of this patent is extended or adjusted under 35 U.S.C. 154(b) by 0 days.

(21) Appl. No.: 10/387,162

(22) Filed: Mar. 11, 2003

(65) Prior Publication Data

US 2003/0173477 A1 Sep. 18, 2003

Related U.S. Application Data

(60) Provisional application No. 60/363,720, filed on Mar. 12, 2002.

(51) Int. Cl.$^7$ .............................. F16M 11/38; F24B 3/00
(52) U.S. Cl. .................... 248/166; 248/436; 126/30; 126/38
(58) Field of Search ................ 248/166, 127, 248/150, 188.6, 346.3, 146, 148, 149, 151, 152, 163.1, 370, 163.2, 165, 170, 436, 439, 177.1; 126/30, 38

(56) References Cited

U.S. PATENT DOCUMENTS

| | | | | |
|---|---|---|---|---|
| 561,857 A | * | 6/1896 | Baxter | 248/439 |
| 573,756 A | * | 12/1896 | Bergstresser | 108/31 |
| 793,151 A | * | 6/1905 | Palmer | 248/439 |
| 963,030 A | * | 7/1910 | Balch | 126/30 |
| 1,104,083 A | * | 7/1914 | Stone | 248/673 |
| 1,617,806 A | * | 2/1927 | Hanson | 126/38 |
| 2,557,594 A | * | 6/1951 | Bryan | 108/118 |
| 3,025,849 A | | 3/1962 | Zimmerman | 126/43 |
| 3,304,040 A | * | 2/1967 | Lomker | 248/150 |
| 3,837,328 A | | 9/1974 | Schaffer | 126/29 |
| 3,905,286 A | | 9/1975 | Le Grady | 99/450 |
| 4,192,480 A | * | 3/1980 | Schmidt | 248/436 |
| 4,297,953 A | * | 11/1981 | Shy | 108/131 |
| 4,334,516 A | | 6/1982 | Dittmer et al. | 126/9 |
| 4,475,528 A | | 10/1984 | Kuchenbrod | 126/9 |
| 4,548,193 A | | 10/1985 | Marogil | 126/30 |
| 4,688,543 A | | 8/1987 | Kopke | 126/25 |
| 4,782,813 A | | 11/1988 | Kopke | 126/25 |
| 4,796,599 A | | 1/1989 | Cooper | 126/30 |
| 4,920,950 A | | 5/1990 | Johnson | 126/29 |
| 5,065,735 A | | 11/1991 | Bourgeois et al. | 126/40 |
| 5,174,197 A | | 12/1992 | Upton | 99/449 |
| 5,452,706 A | | 9/1995 | Meza | 126/30 |
| 5,931,085 A | | 8/1999 | Benzschawel | 99/449 |
| 6,131,560 A | | 10/2000 | Healy | 126/30 |
| 6,182,935 B1 | * | 2/2001 | Talesky | 248/436 |
| 6,213,436 B1 | * | 4/2001 | Hembree | 248/167 |

* cited by examiner

*Primary Examiner*—Anita King
(74) *Attorney, Agent, or Firm*—Thomas, Kayden, Horstemeyer & Risley

(57) ABSTRACT

A backpacker's portable cooking stand that can be used for outdoor cooking and can be foldable to a compact configuration includes a cooking platform for mounting over a source of heat, and foldable legs that are pivoted to over center attitudes for stable use of the cooking stand over a fire and are folded to a compact configuration for travelling.

7 Claims, 3 Drawing Sheets

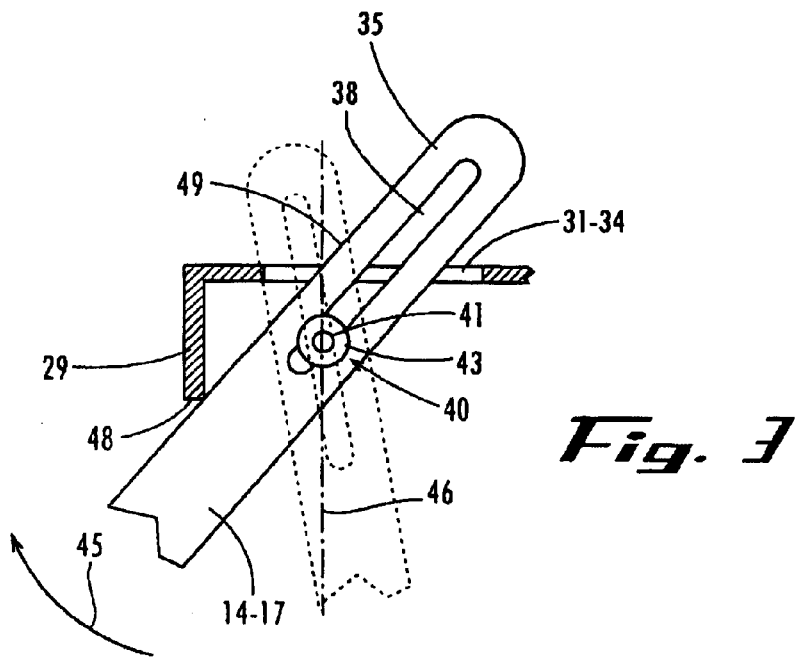
Fig. 3
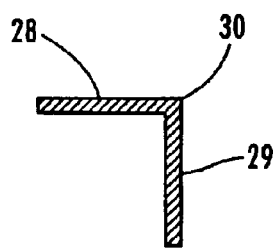
Fig. 4
Fig. 5

BACKPACKER'S COOKING STAND

CROSS REFERENCE

This application claims the benefit of U.S. Provisional application No. 60/363,720, filed in the USPTO on Mar. 12, 2002.

FIELD OF THE INVENTION

This invention concerns an adjustable, portable cooking stand that has a cooking platform for supporting a cooking vessel and legs pivotally mounted to the cooking platform that can be folded between a flat travel configuration with its legs parallel to the cooking platform and an open cooking configuration with its legs extended from the cooking platform to suspend the cooking platform over a fire or other heat source.

BACKGROUND OF THE INVENTION

Cooking stands are used by campers and other people that spend outdoor time away from cooking facilities. Typically, the cooking stands are carried by hikers from camp site to camp site where they are used to support pots, pans, and other cooking utensils over a heat source, such as a fire from canned heat or other sources. The cooking stands must be sturdy for supporting the pots, etc. and their contents, and stable for avoiding tipping over when in use. Also, it is desirable for the backpacker to utilize lightweight and conveniently shaped cooking stands that can be easily carried in a backpack or other personal container for traveling between campsites.

Further, there are times when a campsite has uneven terrain for supporting a cooking stand and other utensils so it is desirable to have the cooking stand be variable in its configuration so that it can be set upon uneven terrain while presenting a cooking surface that is horizontal.

It is to the above features that this invention is directed.

SUMMARY OF THE INVENTION

Briefly described, the present invention comprises a collapsible, light weight, portable cooking stand that is suitable for sturdy and adjustable support for cooking utensils, such as pots and pans, and is foldable to a flat, compact configuration for transporting in a backpack or other container between campsites.

The cooking stand includes a cooking platform or frame that is formed of lengths of angle stock, commonly referred to as "angle iron" even though the material may be aluminum or other material besides iron. The cooking platform includes a frame of angle iron that forms a central opening that is to be placed over a heat source, such as a fire. Support legs are attached, each at one of its ends, to a corner of the cooking platform for supporting the cooking platform above the fire.

The support legs are pivotally connected at their upper proximal ends to the frame so that the lower distal ends can swing out from the frame for engagement with the ground surface. In this configuration, the support legs support the cooking platform over the fire. When the cooking stand is to be packed up for travel to another cooking site, the support legs are loosened from the cooking platform and the lower ends are pivoted up to parallel positions with respect to the frame, which significantly reduces the dimensions occupied by the cooking stand. When in this compact configuration, the cooking stand is capable of being packed in a small space within the typical backpack or other traveling container of the camper.

A feature of the invention is that the support legs of the cooking stand can be adjustably positioned so that an edge of each leg is moved into firm contact with an angle iron segment of the frame when the legs are extended for supporting a pot over a fire. This arrangement tends to avoid inadvertent collapsing of the cooking stand when the cooking stand is engaged by a heavy load, such as a large pot filled with water, etc.

Another feature of the invention is that each support leg is individually adjustable to assume a desired position, so as to accommodate placement of the cooking stand on an uneven ground surface while maintaining the cooking platform in a horizontal attitude.

Thus, it is an object of this invention to provide a light weight, adjustable, collapsible camper's cooking stand that is capable of being folded to a compact configuration for packing and traveling with a camper from campsite to campsite.

Another object of this invention is to provide an improved cooking stand that forms a stable support for cooking utensils in an elevated position over a heat source, such as a fire, but can be collapsed to a substantially flat configuration for moving between campsites.

Other objects, features and advantages of the present invention will become apparent upon reading the following specification, when taken in conjunction with the accompanying drawings.

BRIEF DESCRIPTION OF THE DRAWINGS

FIG. 3 is a side cross-sectional view of the upper, proximal end of a support leg, showing the engagement of the support leg against the bottom edge of a strengthening bar of a segment of angle iron that forms the cooking platform of the cooking stand.

FIG. 4 is an elevational view of the cooking stand, showing how it is placed over a heat source and how a cooking vessel is supported by the cooking platform.

FIG. 5 is a cross-section of an angle iron segment of the cooking platform.

FIG. 6 is a perspective illustration of another embodiment of the cooking stand, showing the legs in their downwardly extended support positions.

FIG. 7 is a side cross-sectional view of the upper, proximal end of a support leg, showing the engagement of the support leg against the bottom edge of a strengthening bar of a segment of angle iron that forms the cooking platform of the cooking stand.

FIG. 8 is a perspective illustration of a third embodiment of the cooking stand, showing the legs in their downwardly extended support position.

DETAILED DESCRIPTION

Figure 1:
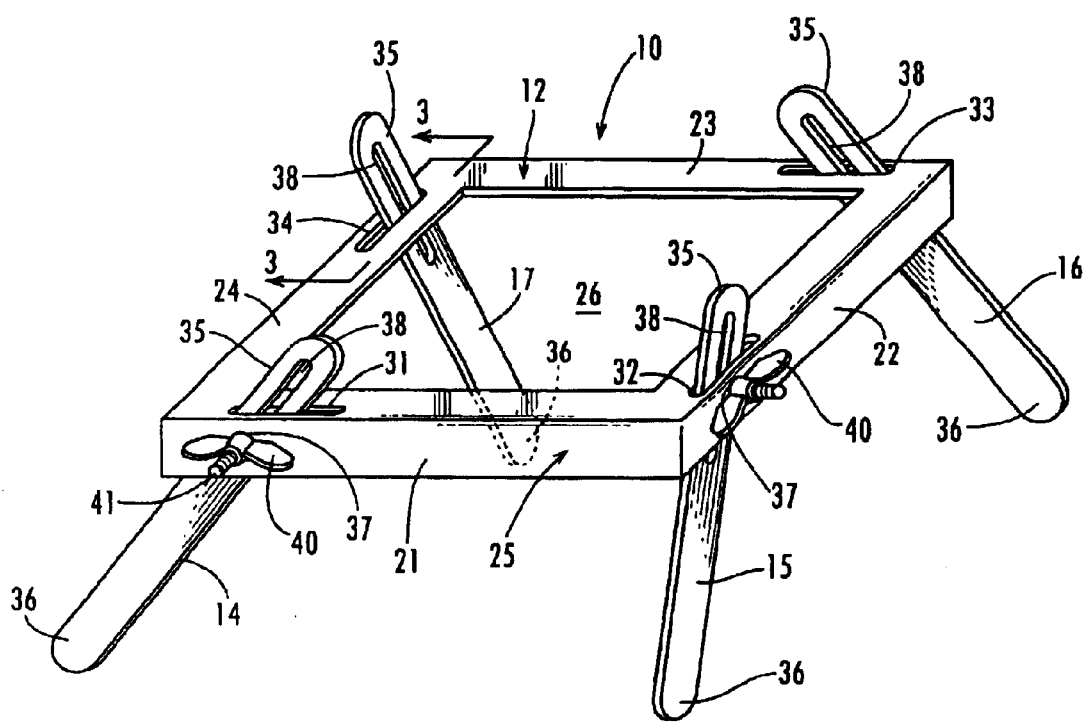
FIG. 1 is a perspective illustration of the cooking stand, showing the legs in their downwardly extended support position.

FIG. 1 illustrates the backpacker's portable cooking stand that is to be used for outdoor cooking. The cooking stand 10 includes a cooking platform 12 for mounting over a source of heat 13, and a plurality of support legs 14, 15, 16 and 17 (FIG. 4). A cooking vessel, such as a pot 19, is to be mounted on the cooking stand, above the source of heat 13.

The cooking platform 12 is formed of segments 21–24 of angle iron, with the segments connected to one another in end-to-end relationship to form a closed perimeter frame 25. The frame defines a central opening 26 for placement over the source of heat 13.

As illustrated in FIG. 5, the angle iron segments 21–24 of the cooking platform each include rectilinear bars formed in an L-shape, including support bar 28 and strengthening bar 29. The support bar 28 is oriented in a horizontal attitude, while the strengthening bar 29 is oriented in a vertical attitude. The bars 28 and 29 intersect each other at their edges to form outer, upper edge 30 that extends about the perimeter of the cooking platform 25. The support bar 28 of each of the segments 21–24 of angle iron are located in a common plane that forms the cooking platform 12 and are oriented in a horizontal attitude when the cooking stand is properly erected, and are engaged by the bottom surface of a cooking vessel 19 (FIG. 4).

The support bars 28 of the segments 21–24 of the perimeter frame 25 that forms the cooking platform each include an elongated leg receiving opening 31–34, respectively, with each opening being placed adjacent the strengthening bar 29 of each angle iron, and with the length of the opening being oriented along the length of the segments of angle iron.

Support legs 14–17 each are formed of a flat bar material, with each leg including an upper, proximal end 35 and a lower, distal end 36. The proximal ends 35 of each leg include an elongated slot 38. The upper, proximal end 35 of each support leg 14–17 is connected by means of a butterfly bolt 40 to the strengthening bar 29 of each segment 21–24 of the angle iron segment 21–24. The butterfly bolts each include a threaded shank 41 that extends through an opening 37 (FIGS. 1 and 6–8) in the strengthening bar 29 of each segment of angle iron 21–24, with the threaded shank 41 having an enlarged head or keeper 43 on its opposite end. The shank 41 of the butter fly bolt 40 extends through the elongated slot of its support leg 14–17, and when tightened, the butterfly bolt 40 and the elongated slot 38 function as an adjustable connector that releaseably holds its support leg 14–17 in a fixed position with respect to the frame 12.

Figure 2:
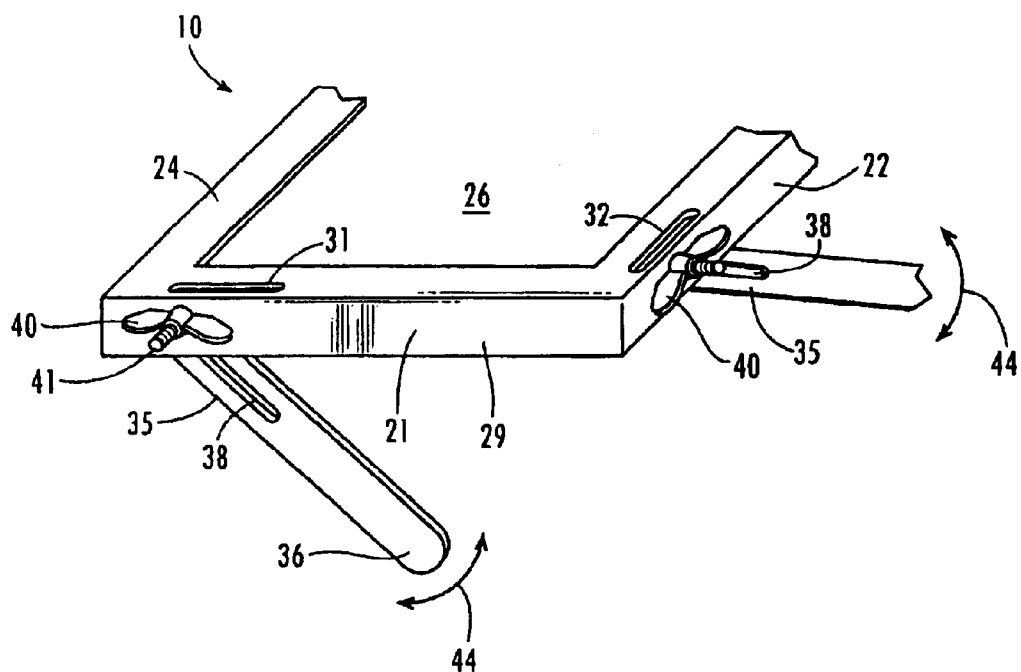
FIG. 2 is a partial perspective illustration, similar to FIG. 1, but showing the movements of the legs from their downwardly extended support positions to their retracted stored positions.

Because the slots 38 of the support legs 14–17 are elongated and extend along the length of each support leg 14–17, each leg 14–17 can be moved with respect to the butterfly bolt 40, longitudinally along its length, and into or out of the leg receiving opening 31–34 of the angle iron frame 12. For example, FIG. 1 of the drawings shows the support legs 14–17 after they have been unfolded from their respective segment of angle iron and moved along their lengths upwardly through the slots 31–34. The legs can be locked in position by tightening the butterfly bolts 40. FIG. 2 shows the legs after the butterfly bolts have been loosened and the legs have been slid along their lengths so that their proximal ends 35 have been withdrawn from the leg receiving openings 31–34, whereupon the legs are free to pivot as indicated by arrows 44. The distal ends of the legs can be tilted up so that they become nested behind and parallel to the strengthening bar 29 of the angle iron segments 21–24, and the butterfly bolt 40 tightened to hold the legs in this retracted position. When in this position, the portable cooking stand is in a compact configuration suitable for placement in the backpack of a hiker.

As illustrated in FIG. 3, it will be noted that when the legs are pivoted downwardly from their storage position to their support position, the legs will be pivoted in the direction as indicated by arrow 45, beyond the vertical position 46, which is indicated by a dashed line in FIG. 3, so that the legs are pivoted to an "over-center" position. The pivoting of the legs is stopped by the engagement of the leg with the lower edge 48 of the strengthening bar 29 of the adjacent segment of angle iron. When the legs have been pivoted to this attitude, the legs can then be moved along their lengths about the threaded shank 41 of the butterfly bolt 40 so that the upper, proximal ends 35 of the legs can be moved through the leg receiving openings 31–34. If the legs are moved upwardly until the lower end of the elongated slots of the legs engage the threaded shank 41 of the butterfly bolts 40, the legs will become stable and will support the weight of a vessel 19 and its contents. In addition, if the butterfly bolt has not reached the end of the elongated slot of the proximal end of the support leg, the leg can be locked in position by tightening the butterfly bolt. Also if the support leg is tilted back across the vertical position 46 as indicated by the dash lines of FIG. 3, the degree of tilt is limited to the position shown by the engagement of the edge 49 of the leg with the end of the elongated leg receiving opening 31–34 or by the edge 48 of the strengthening bar 29. This avoids inadvertent collapse of the cooking stand.

It should be noted that the slots 38 permit the effective lengths of the support legs 14–17 to be adjusted with respect to the cooking platform 12, so as to compensate for irregularities in the surface of the ground on which the cooking stand is to be erected. For example, the legs can be moved so that the elongated slots 38 of the legs are positioned halfway along the threaded shank 41 of the butterfly bolt 40, thereby effectively lengthening the support legs.

The frame 12 that is formed of segments of angle iron can be formed with an additional cooking vessel support that extends across the central opening 26, extending between opposed segments 21 of the angle iron. This permits the safe use of small cooking vessels with the cooking stand 10.

It will be noted that the support legs 14–17 of the cooking stand 10 can be oriented as shown in FIG. 1 so that the distal ends 36 of the legs extend beyond the footprint of the frame 12. This affords the cooking stand with additional lateral support, thereby reducing the likelihood of tilting of the support stand in response to a lateral force.

Another feature of the cooking stand 10 is that the upper, proximal ends 35 of the support legs 14–17 protrude upwardly through the segments 21–24 of the angle iron when the cooking stand is erected. This provides a lateral stop for a cooking vessel 19, so that the cooking vessel placed on the frame 12 is less likely to slide laterally off the frame, and functions to center the cooking vessel 19 on the frame 12.

Figures 6, 7, 8:
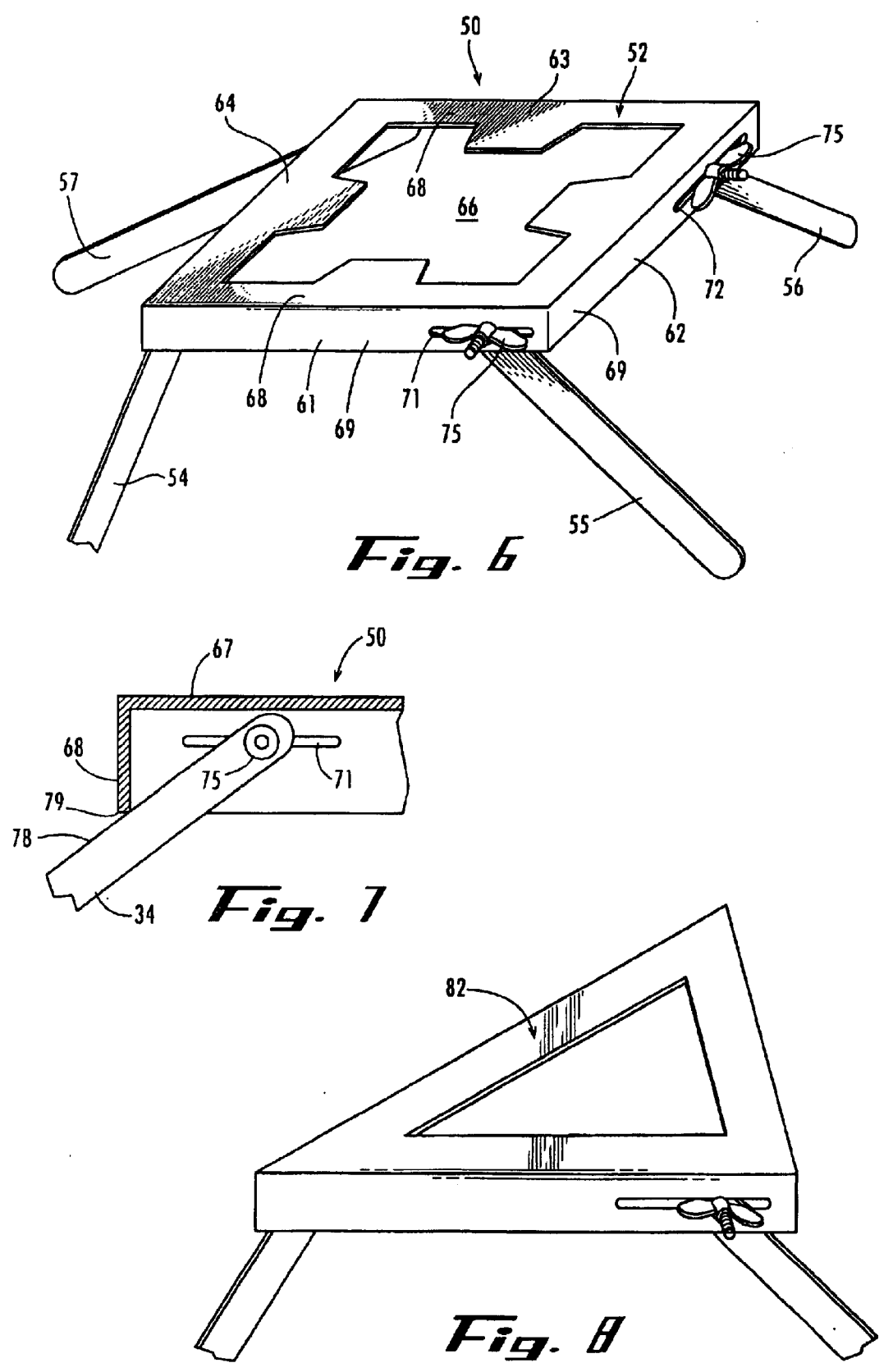

FIGS. 6 and 7 show another embodiment of the cooking stand invention. The cooking stand 50 includes cooking platform 52 and support legs 54–57 that are pivotally mounted at their upper, proximal ends to the cooking platform.

The cooking platform 52, like the cooking platform of FIG. 2, has elongated segments of angle iron 61–64 that are joined together at their ends to form a closed perimeter frame defining a central opening 66. Each segment of angle iron 61–64 comprises the support bar 68 that is oriented in a horizontal attitude and a strengthening bar 69 that is oriented vertically.

Leg retaining slots, such as slot 71 of angle iron segment 61 and slot 72 of angle iron segment 62 extend along the lengths of the strengthening bars 68 of the angle iron segments, and the upper, proximal ends of the support legs 54–57 are mounted in flat abutment with the strengthening bar 68 of the angle iron segments, and are connected thereto by butterfly bolts 75. The butterfly bolts extend through a hole (not shown) in the upper, proximal end 76 of each support leg.

As illustrated in FIG. 7, the support legs, such as support leg 54, can be pivoted so that its edge 78 engages the lower edge 79 of the strengthening bar 68 of the cooking platform 52.

When the support legs 54–57 are each positioned so that they engage the lower edge 79 of a strengthening bar such as strengthening bar 68, and its butterfly bolt 75 is tightened, a rigid support is formed by the support legs with respect to the cooking platform 52.

If the cooking stand 50 of FIGS. 6 and 7 should be placed on a uneven surface, the vertical reach of each of their legs 54–57 can be individually adjusted by sliding the upper, proximal end of a support leg 54–57 along the leg retaining slot 71 and then tightening the butterfly bolt 75. This longitudinal movement of the upper, proximal end of the leg changes the orientation of the leg as it bears against the lower edge 79 of the cooking platform, so that movement of the butterfly bolt toward the adjacent angle iron segment makes the leg effectively longer in a downward direction.

While a square shaped cooking platforms have been illustrated, it will be understood by those skilled in the art that other shapes of cooking platforms 12 can be employed with this invention. Such shapes can be rectangular, triangular, circular, oval, and other geometric shapes compatible with the function of the cooking stand. The support legs are positioned at intervals about the frame for supporting the frame from the ground. In the embodiments illustrated, the legs are positioned adjacent the corners of the square frame 12.

An example of another shaped cooking platform is illustrated in FIG. 8. The cooking platform 82 is triangular shaped. The legs of the cooking stand and the butterfly bolt connection with respect to the leg retaining slots is the same in this embodiment of the invention as described with respect to FIGS. 6 and 7. However, the use of three legs to support a triangular frame requires less adjustment of the legs to achieve a stable support.

Although preferred embodiments of the invention have been disclosed in detail herein, it will be obvious to those skilled in the art that variations and modifications of the disclosed embodiment can be made without departing from the spirit and scope of the invention as set forth in the following claims.

I claim:

1. A backpacker's portable cooking stand for outdoor cooking, comprising:

a frame for mounting over a source of heat;

said frame formed of segments of angle iron, said angle iron segments each having a support bar and a strengthening bar, with said support bar of said segments oriented in a common plane for placement in a horizontal attitude above the ground, and with said strengthening bar extending downwardly from said support bar;

said segments of said frame being formed in a closed perimeter shape defining a central opening for placement over the source of heat;

a plurality of support legs positioned at intervals about said frame for supporting said frame from the ground;

each of said legs having a proximal end positioned adjacent said frame and a distal end for engaging the ground beneath said frame;

connectors positioned at said intervals about said frame, each of said connectors mounting the proximal end of one of said legs to one of said strengthening bars of said frame in a position so that said proximal end of said leg can be pivoted about said connector and into engagement with the strengthening bar of an adjacent angle iron segment of said frame.

2. The backpacker's cooking stand of claim 1, wherein said connectors are positioned to support its leg in an over-center position, so that the legs can extend laterally beyond said frame.

3. The backpacker's cooking stand of claim 1, wherein said frame is formed in a shape selected from: rectangular, square, circular, triangular and oval.

4. A backpacker's portable cooking stand for outdoor cooking, comprising:

a frame for mounting over a source of heat;

said frame being formed in a closed perimeter shape defining a central opening for placement over the source of heat;

a plurality of support legs positioned at intervals about said frame for supporting said frame from the ground;

each of said legs having a proximal end positioned adjacent said frame and a distal end for engaging the ground beneath said frame, said proximal ends of said legs each including an elongated slot formed therein;

said frame defining leg receiving openings at intervals about said frame;

connectors positioned at said intervals about said frame, said connectors each extending through one of said elongated slots of the proximal ends of said legs and mounted to said frame with said slot of said proximal end of said leg slidable and pivotable about said connector, so that said proximal end of said leg can be moved about said connector and protrude through said leg receiving opening, and said leg receiving opening being sized and positioned for limiting the pivotal movement of said leg about said frame.

5. A backpacker's portable cooking stand for outdoor cooking, comprising:

a frame for mounting over a source of heat;

said frame formed of segments of angle iron, said angle iron segments each having a support bar and a strengthening bar, with said support bar of said segments oriented in a common plane for placement in a horizontal attitude above the ground, and with said strengthening bar extending downwardly from said support bar;

said segments of said frame being formed in a closed perimeter shape defining a central opening for placement over the source of heat;

a plurality of support legs positioned at intervals about said frame for supporting said frame from the ground;

each of said legs having a proximal end positioned adjacent said frame and a distal end for engaging the ground beneath said frame;

a connector pivotally connecting said proximal end of each of said support legs to said strengthening bar, said connector being moveable along the length of said strengthening bar for adjusting the distance between said proximal end of said support leg and said strengthening bar of an adjacent segment of said frame, said support legs being pivotable to an over center attitude into engagement with an adjacent strengthening bar of an adjacent segment of said frame for limiting the pivotal movement of the support leg;

so that the effective lengths of said support legs can be adjusted by moving the proximal ends of the support legs along the lengths of the strengthening bars and into engagement with the strengthening bar of an adjacent segment of the frame.

6. The backpacker's cooking stand of claim 5, wherein said strengthening bars each include an elongated leg retaining slot formed therein for receiving said connector so that said connector and said proximal end of said support leg are movable along the length of said elongated leg retaining slot with said leg in contact with the strengthening bar of an adjacent segment of the frame.

7. The backpacker's cooking stand of claim 5, wherein said frame is formed in a shape selected from rectangular, square, circular, triangular and oval.

* * * * *